US008459709B2

(12) United States Patent
Saadat

(10) Patent No.: US 8,459,709 B2
(45) Date of Patent: Jun. 11, 2013

(54) GRIPPER MECHANISM WITH TWO DRIVE SHAFTS PER GRIPPING FINGER

(75) Inventor: Fereshteh Saadat, Soest (DE)

(73) Assignee: M. Mohsen Saadat, Soest (DE)

( * ) Notice: Subject to any disclaimer, the term of this patent is extended or adjusted under 35 U.S.C. 154(b) by 239 days.

(21) Appl. No.: 12/531,280

(22) PCT Filed: Aug. 19, 2008

(86) PCT No.: PCT/DE2008/001364
§ 371 (c)(1),
(2), (4) Date: Sep. 14, 2009

(87) PCT Pub. No.: WO2009/024137
PCT Pub. Date: Feb. 26, 2009

(65) Prior Publication Data
US 2010/0096868 A1   Apr. 22, 2010

(30) Foreign Application Priority Data
Aug. 21, 2007   (DE) .......................... 10 2007 039 398

(51) Int. Cl.
*B66C 1/00*   (2006.01)
*B66C 1/42*   (2006.01)

(52) U.S. Cl.
USPC .............. 294/106; 294/115; 414/917; 901/15

(58) Field of Classification Search
USPC .......... 294/106, 198, 202, 115, 902; 414/917; 901/15, 29
See application file for complete search history.

(56) References Cited

U.S. PATENT DOCUMENTS

| 4,441,852 | A | * | 4/1984 | Dixon | 414/733 |
|---|---|---|---|---|---|
| 4,496,278 | A | * | 1/1985 | Kaise | 414/735 |
| 5,370,493 | A | * | 12/1994 | Oshima | 414/556 |
| 5,451,134 | A | * | 9/1995 | Bryfogle | 414/680 |
| 6,299,228 | B1 | * | 10/2001 | Shin | 294/106 |
| 6,358,285 | B1 | * | 3/2002 | Chen | 623/64 |
| 7,306,423 | B2 | * | 12/2007 | Ogawa et al. | 414/749.1 |

FOREIGN PATENT DOCUMENTS

| DE | 3841041 A1 | 7/1989 |
|---|---|---|
| DE | 4014002 A1 | 10/1991 |
| DE | 20021296 U1 | 5/2001 |
| DE | 102004056299 | 5/2006 |
| JP | 52101567 A | 8/1977 |
| JP | 01246088 A | 10/1989 |
| SU | 568542 A1 | 8/1977 |
| SU | 1337251 A1 | 9/1987 |

* cited by examiner

*Primary Examiner* — Dean Kramer
*Assistant Examiner* — Stephen Vu
(74) *Attorney, Agent, or Firm* — McNeely, Hare & War LLP; James E Mrose

(57) ABSTRACT

A gripper mechanism for machines, robots and manipulation devices comprises at least one moving gripping finger, operated by coupling to an operating mechanism by two drive shafts. As a result of operating the gripping finger by two connecting bars, in turn each driven by the drive shafts, it is possible to move the gripping finger through a rotation over 180° through the path or range thereof and hence securely transmit forces and torques without tipping or getting in an unstable position. The drive shafts are divided axially into at least two parts in order to be housed completely in an enclosed and unitary gripper housing, protected from dust and dirt and hermetically sealed. The different parts of the drive shafts are centered on one another and positively connected by means of axial toothing, in the form of pinion gears and pins, and have a carrier support bearing.

22 Claims, 4 Drawing Sheets

US 8,459,709 B2

GRIPPER MECHANISM WITH TWO DRIVE SHAFTS PER GRIPPING FINGER

CROSS-REFERENCE TO RELATED APPLICATION

This application is an U.S. national phase application under 35 U.S.C. §371 based upon co-pending International Application No. PCT/DE/2008/001364 filed on Aug. 19, 2008. Additionally, this U.S. national phase application claims the benefit of priority of co-pending International Application No. PCT/DE/2008/001364 filed on Aug. 19, 2008 and German Application No. 10 2007 039 398.0 filed on Aug. 21, 2007. The entire disclosures of the prior applications are incorporated herein by reference. The international application was published on Feb. 26, 2009 under Publication No. WO 2009/024137.

BACKGROUND OF THE INVENTION

1. Field of the Invention

The invention relates to a gripper mechanism for machines, robots and handling equipment, comprising at least one movable gripping finger, which, serving as a coupling member of a guiding transmission, is driven by two drive shafts, a crank shaft, belt pulley shaft or pinion or gear wheel or chain sprocket shaft, and which pivots the gripping finger from the foremost operating side rearwardly and sideways.

2. Description of the Prior Art

Gripper mechanisms, the gripping fingers of which are set into motion by a drive shaft move their gripping finger either in rotary fashion by way of a pivotal joint, mounted in the chassis, known as an angular gripper, or parallel as a connecting bar of a linkage parallelogram known as a parallel gripper. Angular grippers have the advantage that their gripping fingers in the opened position can be swung away from the operating region ahead of the gripper housing. Other objects can be transported past the gripper unimpededly. However, they suffer from the great disadvantage that they apply their gripping fingers for different sizes of objects at differing angles against the object which renders the configuring of the gripping jaws as well as the use of the gripper for objects of different sizes to be gripped difficult and greatly limited. The parallel grippers, which conduct their gripping fingers as connecting rods of a linkage parallelogram on the other hand suffer from the disadvantage that their gripping fingers cannot be completely swung sideways out of the operating region ahead of the gripper casing, because the linkage parallelogram assumes an unstable position, the final or extended position, in which the gripping finger cannot apply force to the object being gripped and may in this position also continue to run in anti-parallel fashion.

SUMMARY

Against this background, the invention has as an object to create a gripper mechanism, the gripping finger of which can swing away completely from the operating region ahead of the gripper body, in any gripping position, i.e. even in the final and extended position, safely and without tipping over, in order to combine the broadest possible application of angular and parallel grippers with one another.

The subsidiary claims represent advantageous further developments of the invention.

As a result of the guidance of the gripping finger by two drive shafts, which, in turn, are each driven by a crank, a chain, a gear wheel, a flat belt, a toothed driving belt or a connecting bar, it is possible to move the gripping finger beyond its final or extended position of its guide mechanism, even beyond 180° pivoting of the drive shaft and in doing so safely to transmit forces and torque without tilting over or entering into an unstable position.

Each gripping finger is guided from two points either by two pivotal joints or by one pivotal joint and a sliding linkage. On each of the two pivotal joints or at a pivotal joint and in the sliding linkage of the gripping finger a connecting bar engages which, in turn, is connected to a driven drive shaft (crank shaft, gear wheel shaft, belt pulley shaft, chain sprocket shaft). The drive shafts are driven by means of an actuating unit pneumatically, hydraulically or electro-motorically. The sliding linkage may also be provided in a connecting bar driven by the drive shaft, whereas two pivotal joints are provided on the gripping finger. The sliding linkage may likewise be replaced by a further connecting bar having pivotal joints on both sides, a so-called binary linkage. In the case of a parallelogram-shaped arrangement of the two driven connecting bars which include the actuating member of the actuating unit and also include the gripping finger, the sliding linkage or the binary member may be dispensed with, because the linkage parallelogram has an unambiguous revolving capability, even with two driven connecting bars.

In order for the drive shaft to be able to be accommodated completely in a closed and undivided casing, protected against dust and hermetically sealed, it is divided into at least two sections. In the case of a triple sub-division of the drive shaft, the axle journals on both sides of the drive shafts may, for example, be designed separately as neck bearings on the driven connecting bars. In this manner it is possible for the driven central part of the drive shaft to be made of smaller diameter than the diameter of either of the two axle journals and be inserted during assembly through the larger bearing bore of the gripper casing into the gripper casing. After the assembly of the driven connecting bars of the gripper mechanism with their integrated neck bearings and their axial connection to the central section of the drive shaft, the drive shaft mounting in bearings is completed. One of the two axle journals may also be formed on the central section of the drive shaft divided in two. The two axle journals in that case are provided in the form of neck bearings directly on the driven connecting bar.

For centering and transferring the torque between the individual parts of the divided drive shaft, an axial tooth intermeshing at the end faces of the parts is provided, which can also be provided in the form of a stub tooth gear formation by means of pins and bores.

The axial rotary mounting of the drive shaft is preferably brought about by a journal bearing structure which may be designed in X- or O-configuration. In the case of the X-configuration, the axial bearing surfaces are provided between the end faces of the driven central section of the drive shaft and the gripper casing, i.e. inside the gripper casing. In the O-configuration, the axial bearing surfaces are located on the driven connecting bars coaxially to the neck bearings outside of the gripper casing.

Coaxially about the neck bearings, below the connecting bars driven by the drive shafts, axial sealing rings are advantageously placed, which hermetically seal the gripper casing in order to prevent the influx of dust and dirt into the gripper casing.

In its simplest embodiment a gripper mechanism according to the invention comprises a gripping finger which, by means of two connecting bars, fitted on one side or both sides to the drive shafts, is guided along a preferably circular trajectory and operates as a clamping device against a fixed finger or machine component. If the drive shaft comprises a connecting bar fitted on one side only, the one neck bearing is preferably fitted with or without an axial bearing to this connecting bar. The second neck bearing constitutes a free-wheeling simple rotary member with axial tooth intermeshing or bore formations, with or without axial bearing surfaces serving as an end support bearing, or alternatively it is a fixed component of the driven central section of the drive shaft. Both bearings, the neck bearing and the end support bearing, have a common axis and form the rotary axis of the drive shaft in fixed relationship to the support structure.

If the driven connecting bar comprises two connecting bar halves fitted to the drive shaft on both sides, the two radial bearings together with their axial tooth intermeshing, with or without axial bearing surfaces, preferably serve as a fixed component of the two connecting bar halves in the form of neck bearings.

The casing of a thus designed gripper mechanism can be machined out of the solid material, be cast in one integral piece or be manufactured from an extrusion profile. It comprises a closed cavity for accommodating the drive unit as well as open or U-shaped cavities provided laterally around the drive unit for accommodating the drive shafts. After the assembly of the drive unit and the introduction of the internal components of the drive shaft into the U-profile-shaped cavities provided therefor, the latter are closed by appropriate covers and fastener elements. Finally, the neck bearings, together with or without connecting bars on one or both sides are inserted from outside into the bearing bores of the casing and are fixed axially to the center portion of the drive shaft by way of an axial tooth intermeshing or by means of bores and pins in positive engagement. In the case of a connecting bar on one side only, a free-wheeling end support bearing may form the second neck bearing of the drive shaft. By dividing the drive shaft into at least two sections, a driven center section and a connecting bar as well as by the pitch of their axial tooth intermeshing or of the pins and bores, it becomes possible to mount the driven connecting bars in relation to the position of their drive shaft in variable positionings. A flexible opening and closing position of the gripping fingers is thereby attained, depending on the objective, object size and requirement.

The end faces of the central section of the drive shaft are formed outside of the tooth intermeshing surfaces as an axial bearing surface for a journal bearing support of the X-configuration. They bear against the axial bearing installed in the casing. In the case of the O-configuration of the axial journal bearing of the drive shaft, the axial bearing surfaces are provided at the end faces of the neck bearings on both sides, in the connecting bar and the end support bearing or directly on the driven connecting bar halves. Where the fingers are arranged on one side only, the entire torque of the drive shaft is transmitted from one side onto the connecting bar.

For applications, where a relatively broad gripping jaw is required, a second connecting bar member in minor-image relationship to the first one is fitted to the drive shaft instead of the end support bearing and is fitted outside of the casing together with the other half of the divided gripping finger. The two gripping finger parts are interconnected at their tips by the broader gripping jaw. The division of the finger takes care that the broad gripping jaw, during turning about the gripper casing, will not impact the latter. The four driven connecting bar members, jointly with the two finger halves and the jaw mounting on the one side and the two central sections of the drive shaft mounted inside the gripper casing on the other side result in an integrated bending and torque-resistant finger mechanism. In that case the drive shafts are symmetrically loaded on both sides.

The bending moment and torque act in each of the connecting bars as a tensile or compressive load, whereby the loadability of the gripper is increased enormously. For dusty environments and for explosion-protected applications flat axial seals are employed at the end of the neck bearings outside of the bearing surfaces, but below the driven connecting bars or below the head of the end support bearing in order to seal the gripper mechanism completely.

In all cases the position of the driven connecting bars in relation to the drive shaft in the context of tooth pitch or pitch of the pins and bores can be modified as required in order to adapt the gripping range of individual gripping fingers to the particular application situation.

In the case of a gripper mechanism comprising two or more movable gripping fingers, two driven shafts per gripping finger are provided in analogy to the aforegoing, which are placed concentrically about the actuating unit in order to move all gripping fingers positively and synchronously by means of a single actuating unit.

The gripper mechanism may be actuated pneumatically, electro-motorically, hydraulically or otherwise. The actuating unit either drives both drive shafts of each of the gripping fingers or it drives only a single drive shaft, which, in turn, drives the second drive shaft by way of a connecting bar, a belt or tooth belt drive, intermeshing gears or a drive chain.

It is also conceivable that each finger mechanism is given a drive mechanism of its own, these being optionally coupled to one another, e.g. by springs, in order to be able to also grip securely items which are not centrally positioned or items which are geometrically non-symmetrical.

A thus designed gripper mechanism guides each of its gripping fingers by way of two driven connecting bars or connecting bar pairs serving as a coupler of a multi-member articulated linkage system, even beyond the extended and final positions of its drive members reliably and unambiguously onwards without tilting over or jamming. In this manner, it becomes possible to provide a different range of movement even beyond 180° for each gripping finger and to swing it away out of the operating region ahead of the gripper even when the movement is parallel and to keep the space ahead of the gripper casing available for other tasks.

BRIEF DESCRIPTION OF THE DRAWINGS

In detail, there is shown in.

Identical components are denoted by the same reference number or the same letter. Different indices denote different regions or different designs or multiple provisions of the same element.

DESCRIPTION OF THE PREFERRED EMBODIMENT

Figure 1:
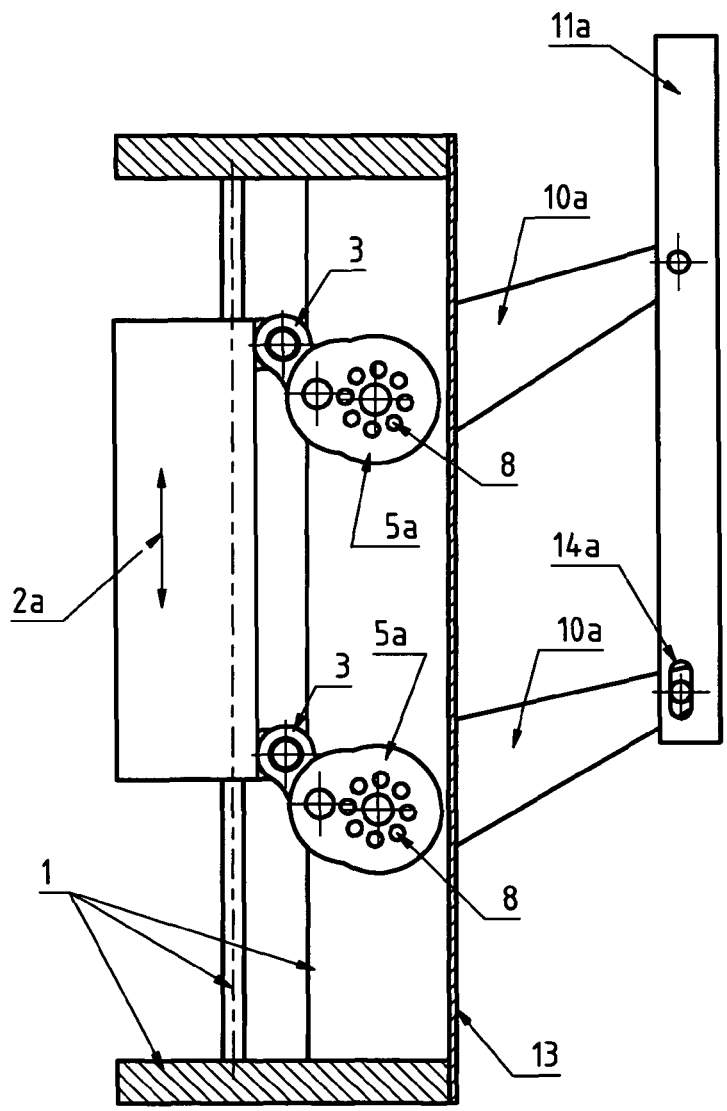
FIG. 1 a longitudinal section through a gripper mechanism according to the invention, comprising two drive shafts per gripping finger which are driven by a slide member and a coupler of a slider-crank mechanism.

According to FIG. 1 the gripper mechanism comprises a stable gripper casing (1), which is to be fitted to the flange of the robot. Within the gripper casing (1) an actuating unit, not illustrated, is accommodated, which pneumatically, hydraulically or electro-motorically brings about translatory movement of the slider (2a). The slider (2a), by means of the couplers (3), drives the crank shafts (5a), which are preferably of multi-section design, and which are fitted to the connecting bars (10a) in positive, yet separable engagement. The connecting bars (10a) at their ends guide the gripping finger (11a) in articulated relationship. Whereas the uppermost connecting bar (10a) is connected to the gripping finger (11a) by a pivoting journal, the lower connecting bar (10a) guides another point of the gripping finger (11a) in a sliding linkage (14a). This permits the connecting bars (10a) to be of different length or the crank shafts (5a) to revolve by different angles, in order to provide the gripping finger (11a) during the opening or closing process with additional swiveling. By the track configuration of the sliding linkage (14a), it is likewise possible to impose additional movement to the gripping finger, more particularly to each gripping finger a different movement, if so required by the handling task. The sliding linkage (14a) may also be provided on only one of the connecting bars (10a), such that the gripping finger (11a) is guided on two pivoting journals. If the two connecting bars (10a) are parallel and of equal length the sliding linkage on the gripping finger or on the connecting bar can be dispensed with entirely. The gripping finger (11a) guided by two connecting bars (10a) is able to move onwards even in its final or extended position in relation to the connecting bars (10a) unambiguously and securely while applying forces and torque onto the gripped object, without tilting over in the course thereof.

The slider (2a) of the actuating unit may be driven pneumatically, hydraulically or electro-motorically. It may be divided into two separate drive means, in tandem or coaxially, by form-fitting, non-positive or frictional interengagement in order to drive the two connecting bars (10a), for example by spring force with retarded action or entirely separately from one another, not illustrated. The cover (13) closes the transmission space hermetically such that the gripper mechanism is completely sealed.

Figure 2:
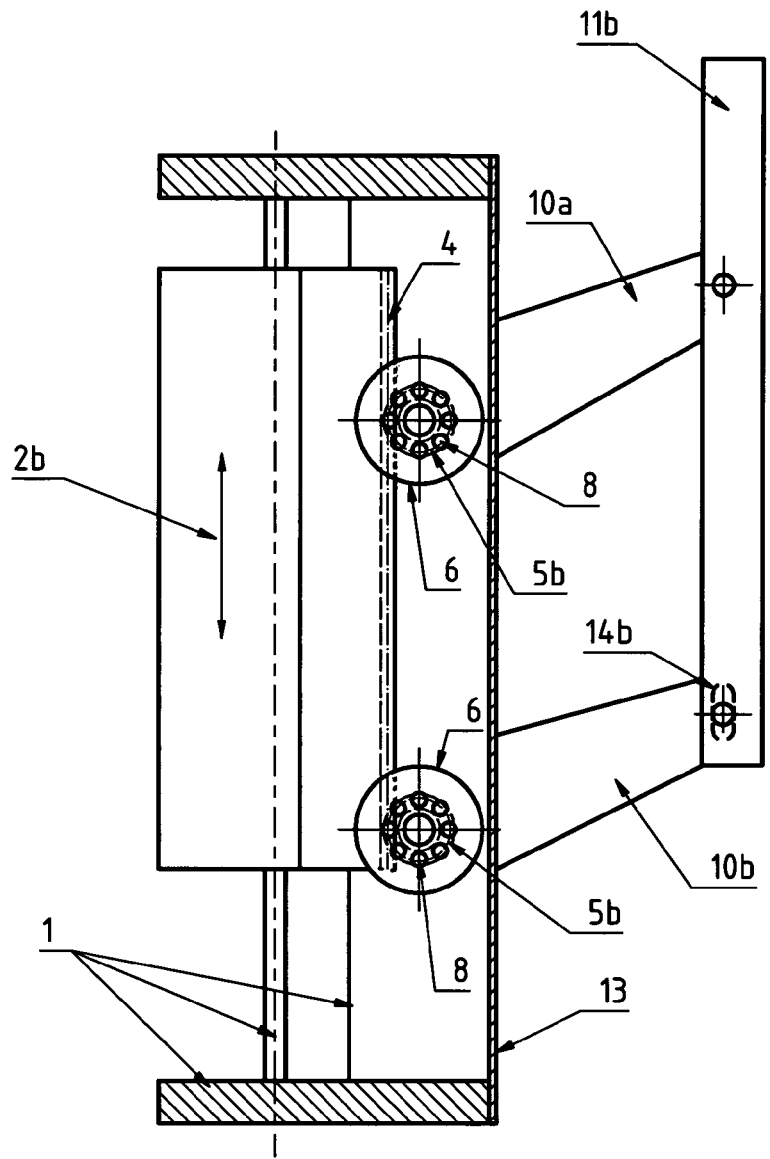
FIG. 2 a longitudinal section through a gripper mechanism according to the invention, comprising two toothed drive shafts per gripping finger, driven by a toothed slider of a gear and tooth-rack drive.

In accordance with FIG. 2 the linearly driven slider (2b) of the actuating unit causes rotary movement by way of its tooth rack (4) to two gear or pinion-driven shafts (5b) which are preferably of multiple-section construction. The radial bearings (6) of the pinion shaft (5b) are either fitted directly to the pinion shaft (5b) or they constitute in the form of neck bearings a fixed component of the connecting bars (10a, 10b), which by means of an axial tooth formation, which may also be provided in the form of a kind of stub tooth intermeshing structure in the form of bores and pins (8), is connected angularly adjustably to the pinion wheels (5b). The upper connecting bar (10a) is connected at its end pivotally to the gripping finger (11b). The lower connecting bar (10b) at its end comprises a sliding linkage (14b) into which the bearing pin of the gripping finger (11b) engages. Both driven connecting bars (10a, 10b) guide the gripping finger (11b) unambiguously also beyond its final and extended position.

Figure 3:
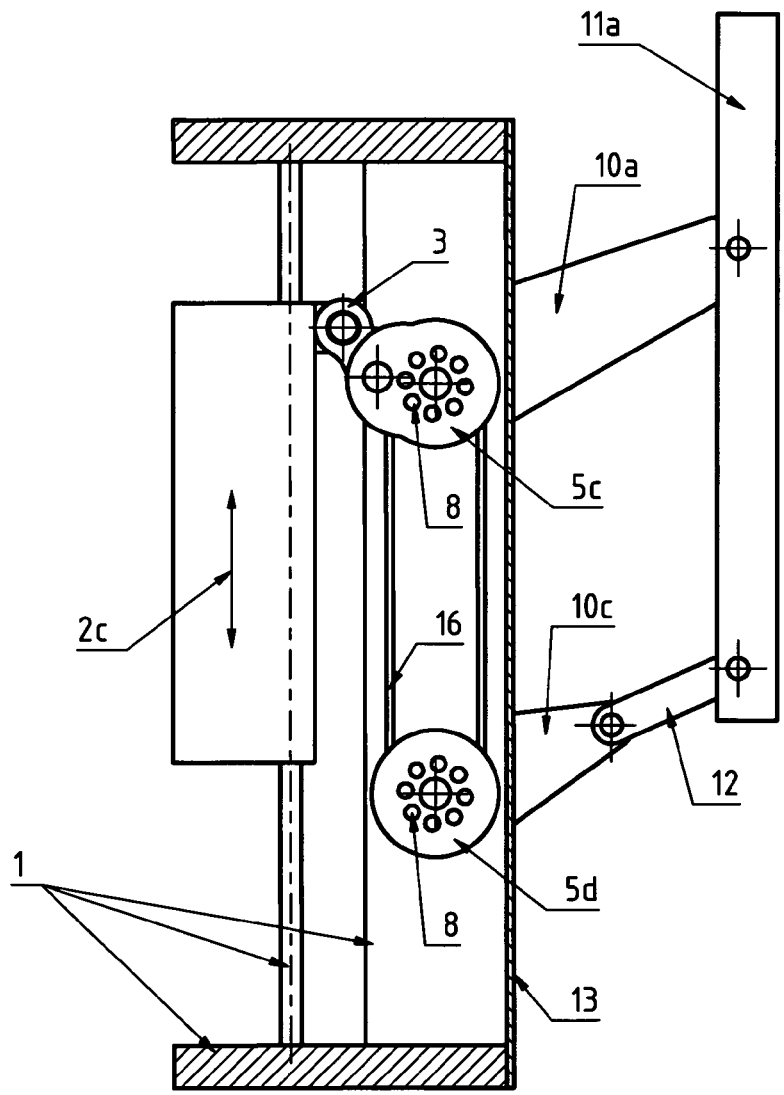
FIG. 3 a longitudinal section through a gripper mechanism according to the invention comprising two toothed drive shafts per gripping finger, of which the first one is driven by a slider-crank mechanism, and the second is driven by the first drive shaft by way of a belt or a chain.

In accordance with FIG. 3 the uppermost crank shaft (5c) is provided with a sprocket for a chain drive or belt drive or tooth belt drive (16) and at the same time drives the lower chain sprocket or belt or tooth belt-driven shaft (5d). It is also possible for the chain drive or belt drive (16) to be replaced by a connecting bar, which by means of its ends engages in articulated manner the two drive shafts (5c, 5d), not illustrated.

In the present case, the sliding linkage (14a, 14b) has been replaced by a binary member (12) having two swivel joints. This thus dispenses with the machining and hardening of the sliding linkage and the sliding block, if present.

Figure 4:
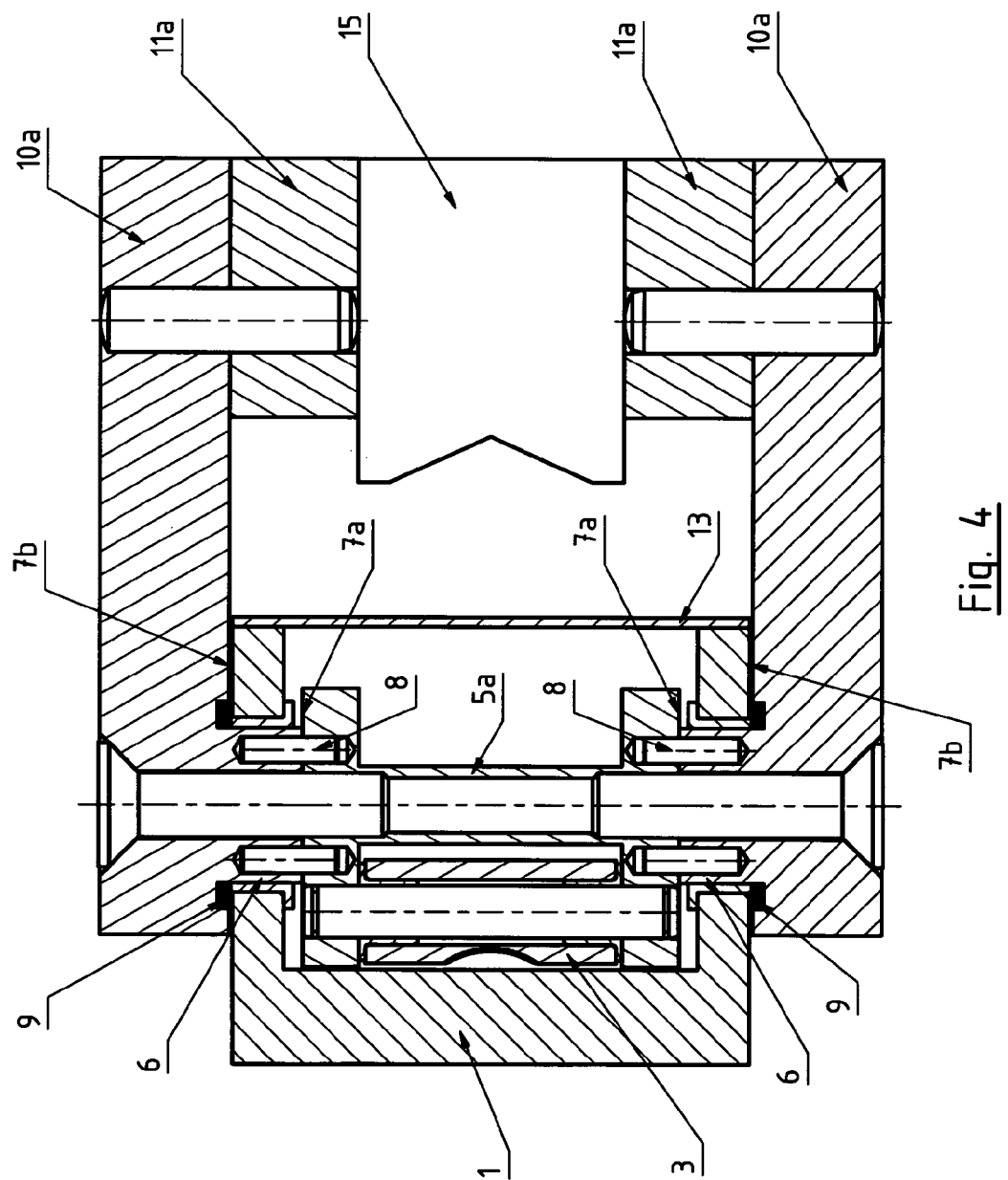
FIG. 4 a cross-section through a driven crank shaft in three sections of the gripper mechanism according to the invention, including a pair of connecting bars pivotally joined to a gripping finger.

In accordance with FIG. 4, the driven connecting bar (10a) is provided on both sides of the driving central section of the crank shaft (5a), i.e. two-fold. Each half of the connecting bar (10a) comprises a radial bearing in the form of a neck bearing (6), an axial sealing ring (9) and, if desired or required, also an axial bearing surface (7b) for a journal bearing support of the O-configuration. The central section of the drive shaft, the crank (5a), forms jointly with the neck bearings (6) of the connecting bar pair (10a) a complete crank shaft serving as the drive shaft and is driven by way of the coupler (3) by the actuating unit. The connecting bar pair (10a) by way of its neck bearings (6) supports and centers the central section of the drive shaft, whether it is a crank shaft, sprocket shaft, belt pulley shaft or chain sprocket shaft, and forms from these, with the aid of the axial tooth intermeshing or the pins (8) and the associated bores, a bending and torque-resistant drive shaft. The axial bearing surfaces (7a) of the drive shaft are preferably provided on the end faces of the central section of the drive shaft and serve for axial support of the drive shaft in the X-configuration. They find support against the innermost collar of the radial sliding bearing having a collar which is fitted into the inside of the casing (1). It stands to reason that the sliding bearing may also be replaced by a roller bearing. In that case, a "fixed-loose"-bearing would be more advantageous.

The connecting bar pair (10a) engages with its free end pivotally into the finger halves (11a) which are interconnected and held spaced-apart by the jaw holding bracket (15).

The features disclosed in the description, the drawings and the claims of the invention may be of importance both individually as well as in optional combination for the practicing of the invention.

All disclosed features are important to the invention.

The invention claimed is:

1. A gripper mechanism for machines, robots and handling equipment, said gripper mechanism comprising:
   a gripper casing;
   at least one movable gripping finger;
   at least two connecting bars directly or indirectly attachable to said gripping finger and adapted to guide and nonlinearly swing said gripping finger away, such that the gripping finger moves in a circumferential direction relative to the gripper casing, out of an operating front position, said connecting bars each having a drive shaft supported by the gripper casing; and
   a driven member attachable to at least one of said drive shafts, said driven member being adapted to cause rotary motion to said at least one drive shaft;
   wherein the gripping finger is guided by way of the two connecting bars as a coupler of a multi-member articulated linkage system comprising the gripping finger and the connecting bars, the gripping finger having no direct bearing at the gripper casing.

2. The gripper mechanism according to claim 1, wherein said drive shafts each have three sections comprising a central section, and two bearing sections serving as neck bearings on both sides of said central section.

3. The gripper mechanism according to claim 2, wherein centering of said central section and said two bearing sections in relation to one another as well as transmission of torque from said central section of said drive shaft onto said bearing sections and from there onto said connecting bars is brought about in form-fitting and separable manner by axial bores with pins.

4. The gripper mechanism according to claim 2, wherein said neck bearings of said drive shafts being a fixed component of said connecting bars driven by said drive shafts.

5. The gripper mechanism according to claim 2, wherein said neck bearings of said drive shafts form a fixed component of said central section of said drive shafts.

6. The gripper mechanism according to claim 2, wherein end faces of said central section of said drive shafts are designed as axial bearing surfaces of said drive shafts.

7. The gripper mechanism according to claim 6, wherein said axial bearing surfaces of said drive shafts are provided at end face sides of said connecting bars driven by said drive shafts.

8. The gripper mechanism according to claim 6, wherein said axial bearing surfaces of said drive shafts are provided at end face sides of a connecting bar and an end support.

9. The gripper mechanism according to claim 1, wherein at least one of said connecting bars is pivotably attachable to said gripping finger, and at least one of said connecting bars is slidably attachable to said gripping finger via a sliding linkage.

10. The gripper mechanism according to claim 1, wherein said driven member drives each of said drive shafts via a plurality of respective couplers.

11. The gripper mechanism according to claim 1, wherein at least one of said connecting bars is pivotably attachable to said gripping finger, and at least one of said connecting bars is attachable to the gripping finger through a binary member pivotably attachable to said at least one connecting bar and said gripping finger.

12. The gripper mechanism according to claim 1, wherein said driven member drives at least one of said drive shafts via a coupler.

13. The gripper mechanism according to claim 1 wherein the driven member is driven electro-motorically.

14. The gripper mechanism according to claim 1 wherein the driven member is a single driven member that drives each of the drive shafts.

15. The gripper mechanism according to claim 1 wherein the driven member is a slide member.

16. A gripper mechanism for machines, robots and handling equipment, said gripper mechanism comprising:
   at least one movable gripping finger;
   at least two connecting bars directly or indirectly attachable to said gripping finger and adapted to guide and swing said gripping finger away, out of an operating front position, said connecting bars each having a drive shaft; and
   a driven member attachable to at least one of said drive shafts, said driven member being adapted to cause rotary motion to said at least one drive shaft;
   wherein said driven member further comprising at least one tooth rack, and said drive shafts each being a pinion drive shaft adapted to engage with and be driven by said tooth rack of said driven member.

17. A gripper mechanism for machines, robots and handling equipment, said gripper mechanism comprising:
   at least one movable gripping finger;
   at least two connecting bars directly or indirectly attachable to said gripping finger and adapted to guide and swing said gripping finger away, out of an operating front position, said connecting bars each having a drive shaft; and
   a driven member attachable to at least one of said drive shafts, said driven member being adapted to cause rotary motion to said at least one drive shaft;
   further comprising a belt attachable to said drive shafts so said drive shaft driven by said coupler drives the other said drive shaft attachable to said belt.

18. A gripper mechanism comprising:
   at least one movable gripping finger;
   at least two connecting bars directly or indirectly attachable to said gripping finger and adapted to guide and swing said gripping finger away, out of an operating front position, said connecting bars each having a drive shaft; and
   a driven member attachable to at least one of said drive shafts, said driven member being adapted to cause rotary motion to said at least one drive shaft;
   wherein said drive shafts each having three sections comprising a central section, and two bearing sections serving as neck bearings on both sides of said central section;
   wherein centering of said central section and said two bearing sections in relation to one another as well as transmission of torque from said central section of said drive shaft onto said bearing sections and from there onto said connecting bars is brought about in form-fitting and separable manner by axial bores with pins;
   wherein at least one of said connecting bars is pivotably attachable to said gripping finger, and at least one of said connecting bars is slidably attachable to said gripping finger via a sliding linkage;
   wherein said driven member further comprising at least one tooth rack, and said drive shafts each being a pinion drive shaft adapted to engage with and be driven by said tooth rack of said driven member.

19. A gripper mechanism comprising:
   at least one movable gripping finger;
   at least two connecting bars directly or indirectly attachable to said gripping finger and adapted to guide and swing said gripping finger away, out of an operating front position, said connecting bars each having a drive shaft; and
   a driven member attachable to at least one of said drive shafts, said driven member being adapted to cause rotary motion to said at least one drive shaft;
   wherein said drive shafts each having three sections comprising a central section, and two bearing sections serving as neck bearings on both sides of said central section;
   wherein centering of said central section and said two bearing sections in relation to one another as well as transmission of torque from said central section of said drive shaft onto said bearing sections and from there onto said connecting bars is brought about in form-fitting and separable manner by axial bores with pins;
   wherein said connecting bars each are pivotably attachable to said gripping finger, and at least one of said connecting bars further comprises a binary member pivotably attachable to said at least one connecting bar and said gripping finger, wherein said driven member drives at least one of said drive shafts via a coupler, and wherein said drive shafts further comprise a belt attachable to said drive shafts so said drive shaft driven by said coupler drives the other said drive shaft attachable to said belt.

20. A gripper mechanism for machines, robots and handling equipment, said gripper mechanism comprising:
- a gripper casing;
- at least one movable gripping finger;
- at least two connecting bars directly or indirectly attachable to said gripping finger and adapted to guide and swing said gripping finger away, relative to the gripper casing, out of an operating front position, said connecting bars each having a drive shaft supported by the gripper casing; and
- a driven member attachable to at least one of said drive shafts, said driven member being adapted to cause rotary motion to said at least one drive shaft;
- wherein the drive shafts each have three sections comprising a central section, and two bearing sections serving as neck bearings on both sides of the central section; and
- wherein said gripping finger comprises at least two gripping finger halves each being attachable to corresponding halves of said connecting bars respectively, and wherein said gripping finger halves are interconnected and held spaced-apart by a jaw holding bracket positionable therebetween.

21. A gripper mechanism for machines, robots and handling equipment, the gripper mechanism comprising:
- a gripper casing;
- at least one movable gripping finger;
- at least two connecting bars directly or indirectly attachable to the gripping finger and adapted to guide and nonlinearly swing the gripping finger away, in a circumferential direction relative to the gripper casing, out of an operating front position, the connecting bars each having a drive shaft supported by the gripper casing; and
- a driven member attachable to at least one of the drive shafts, the driven member being adapted to cause rotary motion to the at least one drive shaft;
- wherein the driven member is driven pneumatically.

22. A gripper mechanism for machines, robots and handling equipment, the gripper mechanism comprising:
- a gripper casing;
- at least one movable gripping finger;
- at least two connecting bars directly or indirectly attachable to the gripping finger and adapted to guide and nonlinearly swing the gripping finger away, in a circumferential direction relative to the gripper casing, out of an operating front position, the connecting bars each having a drive shaft supported by the gripper casing; and
- a driven member attachable to at least one of the drive shafts, the driven member being adapted to cause rotary motion to the at least one drive shaft;
- wherein the driven member is driven hydraulically.

* * * * *